UNITED STATES PATENT OFFICE.

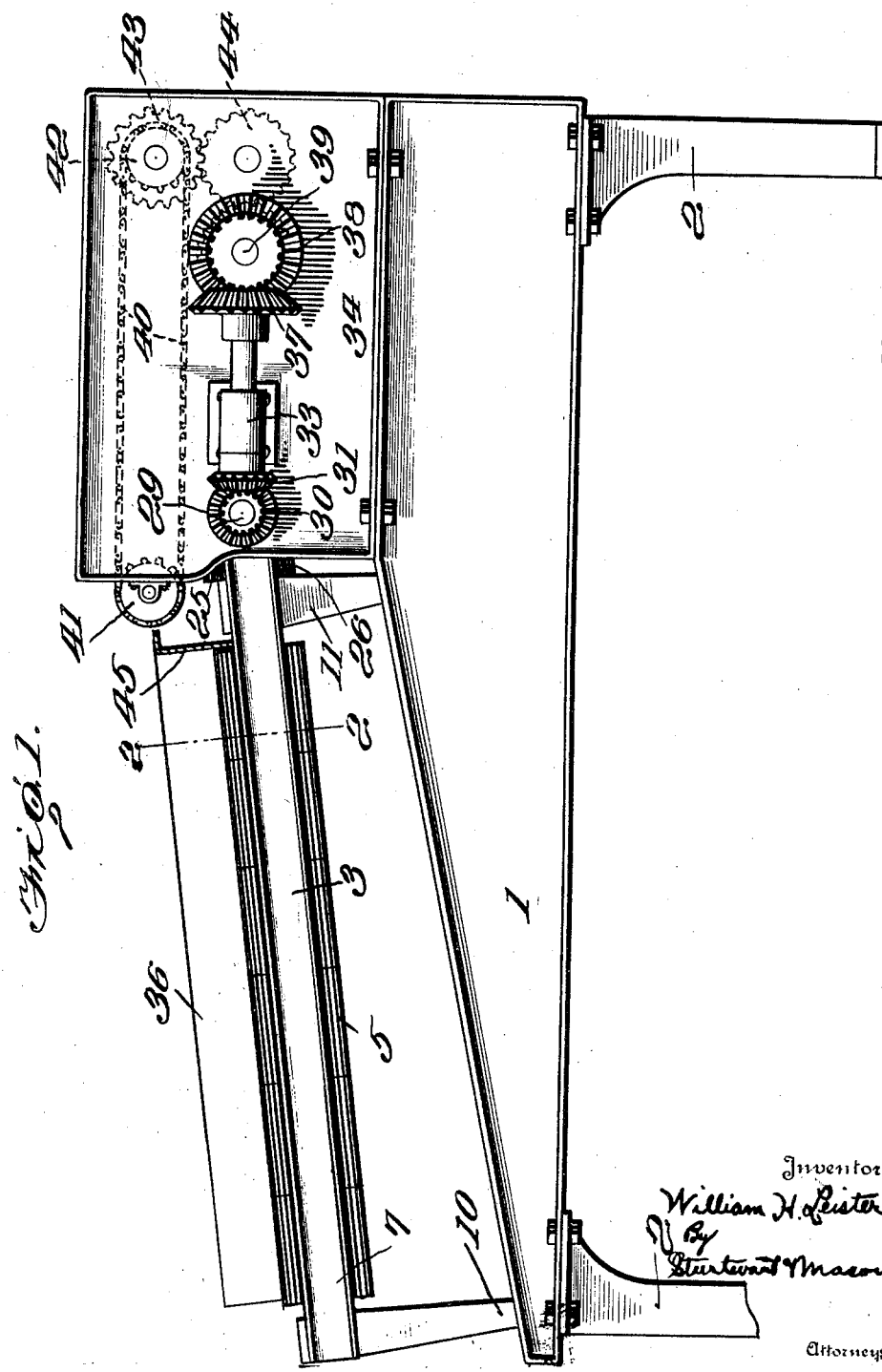

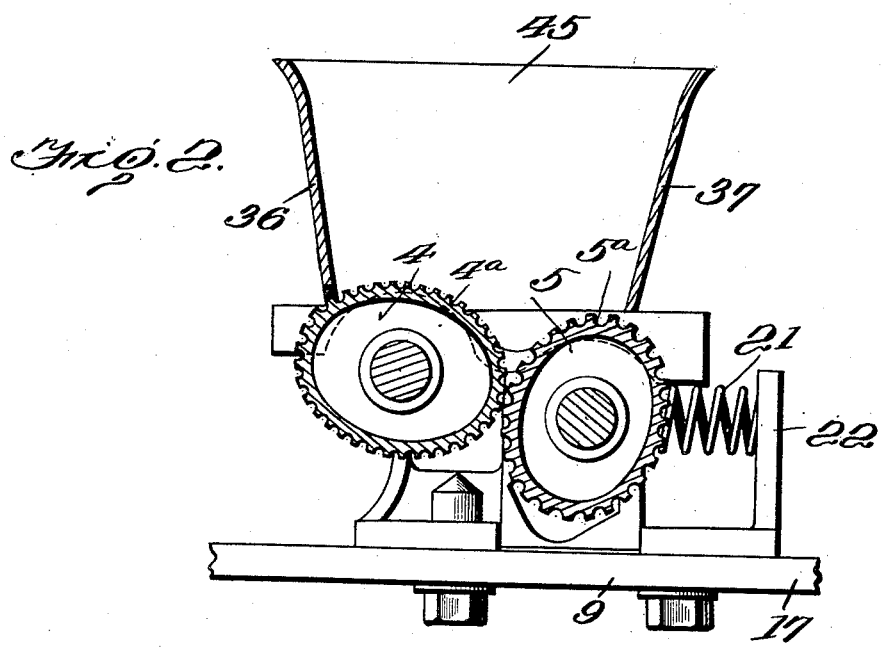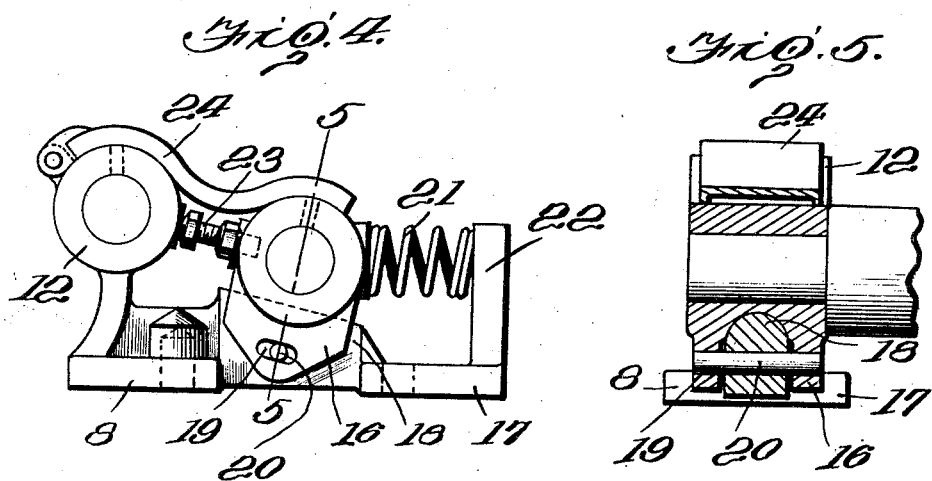

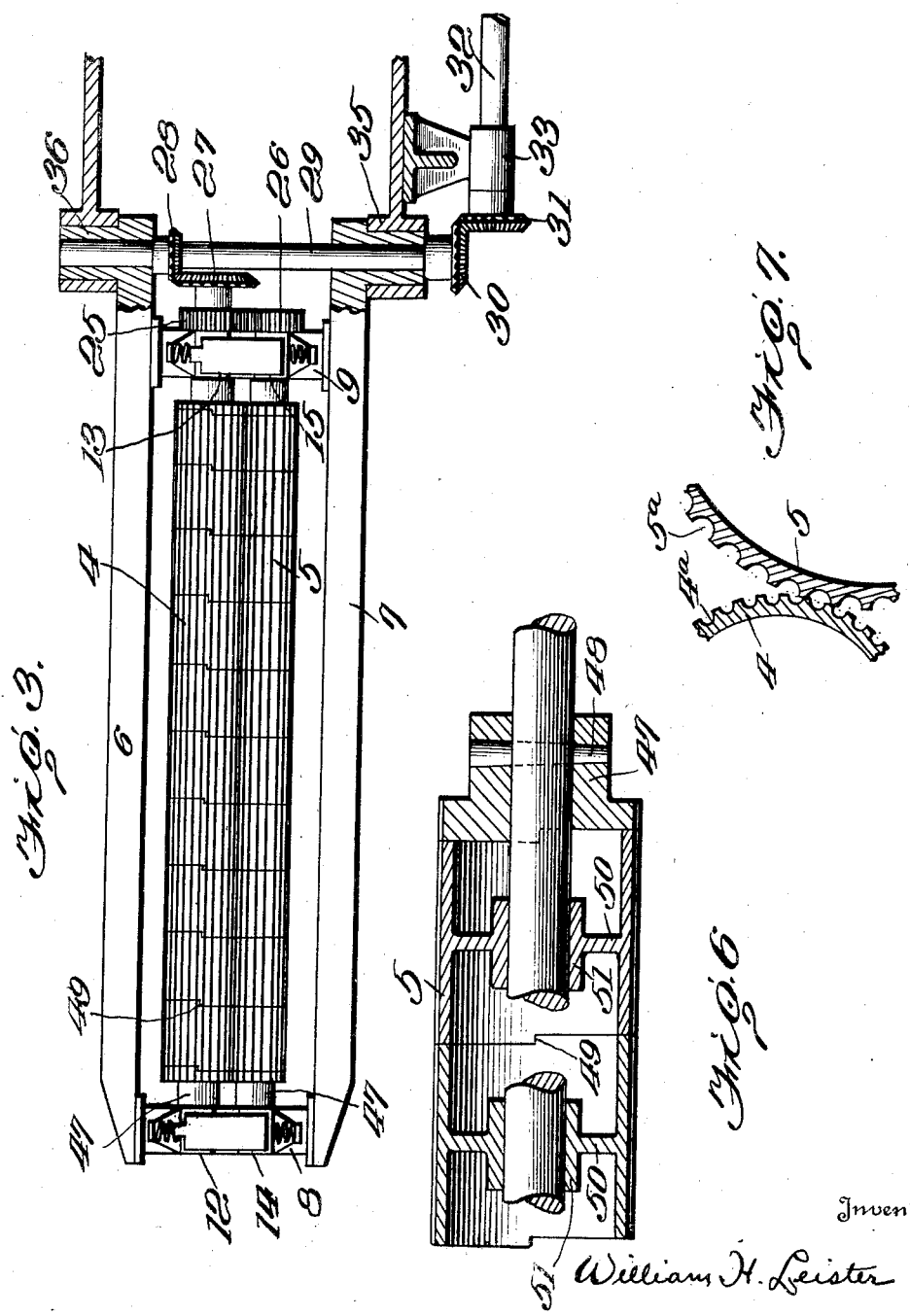

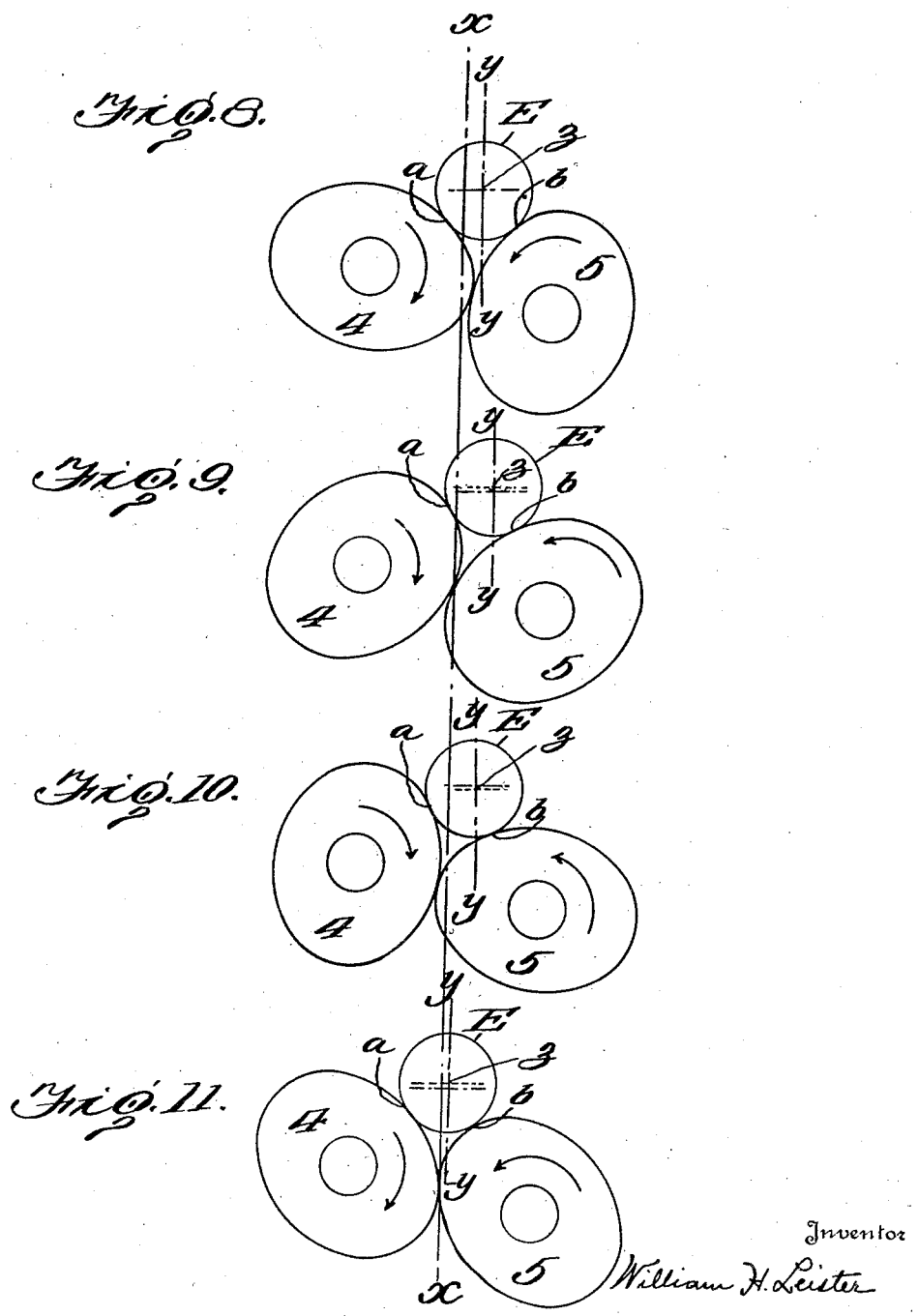

WILLIAM HAMMOND LEISTER, OF WESTMINSTER, MARYLAND, ASSIGNOR TO THE UNITED MACHINERY COMPANY, OF WESTMINSTER, MARYLAND, A CORPORATION OF MARYLAND.

CORN-HUSKING MACHINE.

1,382,792.  Specification of Letters Patent.  Patented June 28, 1921.

Application filed September 20, 1917. Serial No. 192,366.

*To all whom it may concern:*

Be it known that I, WILLIAM HAMMOND LEISTER, a citizen of the United States, residing at Westminster, in the county of Carroll, State of Maryland, have invented certain new and useful Improvements in Corn-Husking Machines, of which the following is a description, reference being had to the accompanying drawing, and to the figures of reference marked thereon.

The invention relates to new and useful improvements in corn husking machines, and more particularly to a corn husking machine adapted to remove the husks and silk from green corn.

It is well known that in the present corn husking machines, there is more or less trouble from a clogging of the ears which may occur before the ear is husked, when it is partly husked, or when it is entirely husked. This clogging is due to the fact that the husks and kernels of green sweet corn are elastic and quite frequently ears are drawn into the bite of the husking rolls. This bite on the ears or husks being continuous and uniform, holds the ear up against or between the husking rolls and prevents its forward movement either wholly or partially, thus producing what is termed a slow clogging. Also the clogging or congesting of the ears has been caused in the husking machines as at present devised, by the ears resting on one another on the husking means, even though the ears are fed singly thereto. This is due to the fact that the ears are irregular in size and shape and the tendency of some husks to adhere more firmly to the ears than others, causing the ears to lag when husked, while others move more quickly and lodge on the same. Then again, clogging of the ears sometimes occurs when a number of ears are fed simultaneously and indiscriminately onto the husking rolls.

The great variations in the size and shape of the stock and the tenderness of the kernels of green corn, have rendered impracticable overhead and side adjustable feeding or separating means which have been devised for preventing this clogging of the ears.

An object of the present invention is to provide a husking machine wherein co-acting devices operate upon the ears entirely from beneath for husking the same and for agitating or tumbling the ears to prevent clogging.

Another object of the invention is to provide a husking machine wherein the husking devices are constructed so as to tumble the ears as they are passing through the husking machine and being husked.

Another object of the invention is to provide a husking machine of the above character wherein the line of coöperative action between the husking tumblers is shiftable relative to a vertical plane parallel to and centrally between the axes of the tumblers.

A further object of the invention is to provide a husking machine having rotating husking devices constructed so that the husking force,—that is, the husk-stripping force—of each device on the ear of corn, varies during each rotation of said devices.

A still further object of the invention is to provide a husking machine of the above character wherein the husking force of one device increases while the other decreases, and vice versa.

Another object of the invention is to provide a husking machine of the above character, wherein the husking devices are so arranged that the husking force of one device is at all times greater than the other, whereby the ear of corn is caused to rotate, which facilitates its travel along said devices.

A still further object of the invention is to construct a husking machine provided with husking tumblers having a varying husking force on the ears wherein the coöperative husking pull of the tumblers is substantially uniform.

Another object of the invention is to provide a husking machine having husking tumblers of the above character, wherein the tumblers are of uniform cross section throughout, so that the tender kernels of corn will not be injured through the action of the tumblers thereon.

A further object of the invention is to provide a husking machine of the above type wherein the husking tumblers are arranged with the axis of rotation of one tumbler slightly higher than the other, in order to assist in the rotation of the ear and the tumbling of the same during husking.

A still further object of the invention is to provide husking tumblers of the above character, wherein each tumbler is made up of a number of sections interlocked so as to maintain their proper relation.

These and other objects will in part be obvious and will in part be hereinafter more fully described.

In the drawings, which show by way of illustration one embodiment of the invention,—

Figure 1 is a longitudinal sectional view through a corn husking device embodying my improvements;

Fig. 2 is a sectional view on the line 2—2 of Fig. 1;

Fig. 3 is a plan view of the husking tumblers and the supporting bearings therefor;

Fig. 4 is an end view showing the supporting bearings of the husking tumblers;

Fig. 5 is a sectional view on the line 5—5 of Fig. 4;

Fig. 6 is a longitudinal sectional view through a portion of one of the tumblers;

Fig. 7 is an enlarged transverse sectional view through a portion of the tumblers, showing the husking contact point thereof; and Figs. 8 to 11 inclusive, are diagrammatic views showing cross sections in different positions of the husking tumblers with an ear of corn thereon.

The invention consists broadly in a husking machine of one or more units, in which each unit includes a pair of rotating or coacting tumblers, which serve as combined means for stripping the husks and silk from the ears of corn, for feeding the ears of corn through the husking machine, and rotating and agitating the ears of corn as they pass along the tumblers, to prevent clogging and to give increased efficiency in the husking operation.

These tumblers in the present embodiment of the invention are of the general nature of rolls, that is, they are elongated elements rotating about their longitudinal axes. As above noted, they are arranged in pairs with their axes parallel with each other. Each tumbler is uniform in cross section throughout and free from projections which might be liable to injure the tender kernels of corn. Some portion of, or all of the husking surface of each tumbler is eccentric or irregularly formed relative to its axis of rotation. These eccentric or irregular surfaces on the respective tumblers are so disposed relative to each other as to produce a rapidly varying or shifting coöperative action which results in the tumbling of the ears as they are being husked.

The tumblers are also shaped so as to produce a varying husking force, that is, a varying force for stripping the husks from the ears at the points where the ears contact with the tumblers, and the husking force increases on one tumbler as it decreases on the other tumbler, and vice versa. The varying husking force and the varying point of application of the husking force, together with the shifting husking line or husking pull, all contribute to preventing slow clogging of the ears and to the efficient removal of the husks and silk from the ears.

Referring more in detail to the drawings, I have shown my improved husking machine as consisting of a single unit. The main supporting frame 1 is mounted on supporting legs 2, 2, and the husking unit indicated at 3, is mounted on this frame.

The husking unit consists of two tumblers 4 and 5. These tumblers are carried by an auxiliary frame consisting of side members 6 and 7 and cross pieces 8 and 9. The side members or cross pieces are mounted on supporting brackets 10 and 11, which in turn are mounted on the main frame 1. The tumbler 4 is journaled in bearings 12 and 13. The tumbler 5 is mounted to rotate in bearings 14 and 15. These bearings 14 and 15 are mounted in pivoted supports 16, which are similar in construction. Mounted on the cross piece 8 is a bracket 17. This bracket carries the bearing 12. Projecting upwardly from the bracket 17 is a rib 18. The pivoted support 16 for the bearing 14 straddles this rib and is formed with a slot 19, through which a pin 20 extends. This pin passes through the rib and serves as the pivot mounting for the support which carries the bearing. This support 16 has a socket formed in one face thereof, and a spring 21 engages this socket. The other end of the spring 21 engages the standard 22.

An adjustable stop 23 limits the movement of the pivoted support toward the bearing 12. A pivoted yoke 24 carried by the bearing 12 normally engages the support 16. As above noted, the two supports for the bearings 14 and 15 are similar in construction, and these supports are pressed by their springs toward the bearings 12 and 13 respectively, and thus the tumbler 5 is yieldingly pressed toward the tumbler 4.

These tumblers are mounted to rotate in their bearings toward each other at the point of engagement with the ear. The tumbler 4 is provided with a gear wheel 25, which meshes with the gear wheel 26 on the tumbler 5. The shaft of the tumbler 4 is extended and carries a bevel gear wheel 27, which meshes with a bevel gear 28 on a cross shaft 29. This cross shaft is mounted in bearings carried by the auxiliary frame 3 and the cross shaft carries a bevel gear 30, which meshes with a bevel gear 31 carried by a shaft 32, which is mounted to rotate in the bearing 33.

Mounted on the main frame is an extension frame 34, and the bearing 33 is mounted in this extension frame. The auxiliary frame is attached to the extension frame 34 by bearings 35 and 36, which are concentric to the shaft 29.

The cross shaft 32 carries a second bevel gear 37, which meshes with a bevel gear 38 on the main shaft 39.

The ears of corn to be husked are delivered to the husking tumblers by an endless conveyer 40. This endless conveyer runs over sprocket wheels 41 and 42 mounted in the extension frame 34. On the shaft carrying the sprocket wheel 42 is a gear 43 which meshes with a gear 44, and this gear in turn meshes with a gear on the main shaft 39.

The conveyer may be operated continuously and suitable guiding devices provided, so that the ears placed one after another or indiscriminately on this conveyer, will be carried forward in an endwise direction and delivered onto the husking tumblers. At the receiving end of the husking tumblers there is a plate 45, which insures that the ears will be delivered onto the tumblers. The husking tumblers are parallel and longitudinally extended and the ears are conveyed along said tumblers as they are being husked as distinguished from the type of husking roll and snapping roll wherein the ears move at right angles to the axis of rotation of the rolls.

Along each side of the tumblers are side plates 36 and 37, which are rigid, and simply serve as a means for guiding the ears, so that they will be kept in contact with the tumblers.

My invention is directed more particularly to the shaping of the tumblers, and, therefore, the details as to the driving of the tumblers, bearings for the same, and means for delivering the ears of corn one after another onto the tumblers, may be modified, added to, or dispensed with in part, and have been described purely for the purpose of illustrating one embodiment of some of the essential features necessary to coöperate with my improved tumbling rolls.

The tumbling rolls, as shown more clearly in Fig. 2 of the drawings, are elliptical in cross section, and, therefore, are eccentric throughout their entire periphery. While I have shown and described the tumblers as elliptical in cross section, it will be understood that the cross sectional form of the tumblers may be varied. The essential feature consists in that each tumbler shall have ear supporting and husking surfaces located at different distances from its axis of rotation and that said surfaces shall be of sufficient extent to positively tumble the ear about transversely a plurality of times during its movement longitudinally of the tumblers. Furthermore, when the tumblers are so constructed and set with a surface of greater distance from the axis on one tumbler coöperating with a surface of lesser distance from the axis of the other tumbler, then the husking line will shift back and forth transversely of the direction of movement of the ear, which will further aid in the tumbling of the ears to facilitate the removing of the husks therefrom. Each tumbling roll is also made up of sections and these sections are carried by a shaft which serves as a means for turning the tumblers. The sections are held in place on the shaft by heads 47 and locking pins 48. These sections are similar in shape and they are interlocked so as to be maintained in a proper relation to each other by engaging shoulders 49, which prevent one section from turning relative to the next adjacent section. The heads 47 which are pinned to the shaft, are also similarly notched and interlocked with the sections forming the tumbler. In this way, the sections are all firmly united to the shaft, so that they will maintain their relation to each other, and thus are held against axial or rotary displacement. Each section forming the tumbler is hollow, and has an internal web 50 carrying a bearing sleeve 51, which engages the shaft.

By making the tumblers in sections and hollow, as above described, said tumblers will spring or yield at one point without affecting materially the husking contact at other points, thus permitting a husking contact pull at all parts of the tumblers at the same time. This yielding of the tumbler sections also relieves the strain on the bearings.

The elliptical sections of the tumblers are so disposed on their respective shafts that the major axis of one tumbler is in line with the minor axis of its opposed tumbler when said major axis reaches a position so that it lies in a plane intersecting the axis of the other tumbler. In other words, the husking surface at the major axis of one tumbler coacts with the husking surface at the minor axis of the other tumbler.

It will be noted, however, due to the fact that each tumbler is elliptical in cross section and the tumblers are driven by circular gears, that the surface speed of the respective tumblers at the husking line or point of coöperative contact between the tumblers, will vary, which gives a movement to one husking surface relative to the other which results in a sawing husking pull. It will be noted however, that when tumblers are used that are elliptical in cross section, said tumblers may be in substantially continuous gripping relation to each other throughout the entire rotation of the tumblers even though driven by circular gears.

The husking surfaces of these tumblers are provided with grooves 4$^a$ and 5$^a$, respectively, which extend from end to end of the tumblers but the peripheral surface of each tumbler is substantially uniform in cross section throughout its entire length. These grooves are parallel and also preferably parallel with the axis of the tumbler, thus forming a corrugated husking surface extending throughout the entire length of each tumbler. The tops of the corrugations form the peripheral surface of the tumblers.

It will be understood that these grooves forming the corrugations are not of sufficient size to form projecting shoulders which would in any way injure the more or less tender kernels of the ears of corn. The corrugations do, however, increase the grip of the husking tumblers on the husks and also increase the draw or suction force or pull of the husking tumblers on the husks. One of the husking tumblers is set higher than the other, so that the weight of the ear of corn may rest to a greater extent on the lower tumbler. This lower tumbler has its corrugations made slightly larger than the corrugations of the other tumbler. The purpose of this positioning of the tumblers and the enlarged corrugations, is to spin the ear as it passes along the tumblers. The spinning of the ear greatly aids in the husking and silking of the ear, not only from the greater shearing action caused by contact with the revolving tumblers, but because the revolving motion causes the loose ends of the husks and silk to free themselves from the ear, thereby permitting the tumblers to grasp and remove the same more easily.

The action of the tumblers on the ears of corn being husked will be clear from the diagrammatic Figs. 8 to 11 of the drawings, which show different positions of the tumblers and wherein the ear is indicated by the circle E.

As above noted, there is a husking draw or suction on the husk brought about by the coöperative action of the tumblers. At the line of nearest approach of the tumblers the husks will be gripped by the tumblers and stripped from the ears. This line of nearest approach of the two husking tumblers where the husks are gripped through the coöperative action of the tumblers, I have termed the line of husking contact between the tumblers. Owing to the shape of the husking tumblers this husking line shifts sidewise or at an angle to a vertical plane passing centrally between the axes of the tumblers. In Fig. 8 the center of the ear that rests on the tumblers is at one side of this vertical plane, which is indicated in the line x—x. The center plane of the ear is indicated by the line y—y, while the center of the ear is indicated by the point z.

The tumblers rotate in the direction of the arrows on the drawings. When the tumblers have made a partial rotation to the position as indicated in Fig. 9, the center plane y—y of the ear has shifted away from the vertical plane x—x and the center of the ear z has raised. Another partial rotation brings the tumblers to the position shown in Fig. 10 of the drawings. Here the center plane y—y of the ear has moved back toward the vertical plane x—x and the center z has dropped. Another partial rotation brings the tumblers to the position shown in Fig. 11. The center plane y—y has moved still nearer the vertical plane x—x and the center z is again raised.

The above movements of the ear are at an angle to the longitudinal axis of the ear or transversely of the ear and are also alternately in different directions as the tumblers rotate, and this brings about a positive tumbling of the ear a plurality of times during its movement longitudinally of the tumblers.

Referring again to Fig. 8, it will be noted that the ear E makes contact with the tumbler 4 at a and with the tumbler 5 at b. As the tumblers rotate these lines of contact in effect travel around their respective tumblers in a direction opposite to their direction of rotation. As this line of contact approaches the major diameter of the tumbler, the ear is side-swiped or pressed sidewise, resulting in this sidewise shifting of the ear referred to above. This side-swiping of the ears and sidewise shifting thereof results in a tumbling of the ears. It will be noted that the axes of the tumblers incline downwardly, and that the ears resting on the tumblers also incline downwardly, and this changing force against the ear shifting it sidewise relative to the vertical plane of the tumblers not only tumbles the ear about, but moves it forward or down the tumblers. This excessive agitation of the ear as it is being husked, avoids the piling up of the ears one on the other, as noted above, and also serves to shake the ears out of the husks, thus aiding in freeing the husks from the ears.

Then again it will be noted that the husking force, which is the force of the tumbler at the line of contact between the ear and the tumbler serving to strip the husks from the ears, varies during the rotation of each tumbler, although it is continuous. When this point of contact a for example, is moving from the minor axis of the tumbler toward the major axis of the tumbler, the force of the tumbler against the ear is increasing as it is lifting and side-shifting the ear.

On the other hand, when this line of contact is approaching the minor axis of the tumbler, the side pressure is decreasing, permitting the ear to move toward the plane x—x, and, therefore, the husking force of this tumbler on the ear at this time is decreasing. When the husking force of one tumbler is increasing, the other is decreasing, and vice versa. This varying husking force not only increases the efficiency of the husking tumblers, but it also serves to break up or destroy any slow clogging of the ears being husked.

As above noted, a slow clogging in husking machines heretofore designed has been brought about through the uniform bite of the husking rolls on the ear. While the husking pull of my tumblers and the suction or draw on, the husks may be substantially uniform, the side shifting of the ear and the varying of the husking force of the tumblers directly against the ears breaks up and destroys this uniform bite, and, therefore, prevents slow clogging.

From the above it will be apparent that I have provided a husking machine wherein the ears of corn will not clog by piling on top of each other, even though the ears are fed promiscuously thereto. Furthermore, the agitation of the ears and the varying husking forces thereon prevent the ears from being drawn and held in the bite of the tumblers, and, therefore, all slow clogging of the ears is avoided.

It is obvious that changes in shape of the tumblers may be made without departing from the spirit of my invention as defined in the appended claims, provided the functions and results above stated are retained.

Having thus described my invention, what I claim as new and desire to secure by Letters Patent, is:

1. A husking machine including in combination, a plurality of substantially parallel longitudinally extending rotary tumblers along which the ears are conveyed, each of said tumblers having ear supporting and husking surfaces throughout the longitudinal extent and periphery thereof disposed at different distances from its axis of rotation, said surfaces being of sufficient extent and location whereby the ears are positively tumbled about transversely a plurality of times during their movement longitudinally of the tumblers.

2. A husking machine including in combination, a plurality of substantially parallel longitudinally extending rotary tumblers along which the ears are conveyed, each of said tumblers being of substantially uniform peripheral cross section throughout its length and having sections of its peripheral surface disposed at different distances from its axis of rotation whereby the ears are positively tumbled about transversely a plurality of times during their movement longitudinally of the tumblers.

3. A husking machine including in combination, a plurality of substantially parallel longitudinally extending rotary tumblers along which the ears are conveyed, each of said tumblers having sections of its peripheral surface disposed at different distances from its axis of rotation, said sections being of sufficient extent and location whereby the ears are positively tumbled about transversely a plurality of times during their movement longitudinally of the tumblers, said tumblers having a surface of greater distance from the axis of one tumbler coöperating with a surface of lesser distance from the axis of the other tumbler.

4. A husking machine including in combination, a plurality of longitudinally extending rotary tumblers along which the ears are conveyed, each of said tumblers having sections of its peripheral surfaces disposed at different distances from its axis of rotation, said sections being of sufficient extent and location whereby the ears are positively tumbled about transversely a plurality of times during their movement longitudinally of the tumblers, said tumblers being in substantially continuous gripping relation to each other throughout the entire rotation of the tumblers.

5. A husking machine including in combination, a plurality of substantially parallel longitudinally extending rotary tumblers along which the ears are conveyed, each of said tumblers being of substantially uniform peripheral cross section throughout its length and having sections of its peripheral surface disposed at different distances from its axis of rotation whereby the ears are positively tumbled about transversely a plurality of times during their movement longitudinally of the tumblers, said tumblers being in substantially continuous gripping relation to each other throughout the entire rotation of the tumblers.

6. A husking machine including in combination, a plurality of substantially parallel longitudinally extending rotary tumblers along which the ears are conveyed, each of said tumblers being of substantially uniform peripheral cross section throughout its length and having sections of its peripheral surface disposed at different distances from its axis of rotation whereby the ears are positively tumbled about transversely a plurality of times during their movement longitudinally of the tumblers, said tumblers having a surface of greater distance from the axis of one tumbler coöperating with a surface of lesser distance from the axis of the other tumbler.

7. A husking machine including in combination, a plurality of substantially parallel longitudinally extending rotary tumblers along which the ears are conveyed, said tumblers being similar in cross section, and of substantially uniform peripheral cross section throughout its length and sections of its peripheral surface disposed at different distances from its axis of rotation whereby the ears are positively tumbled about transversely a plurality of times during their movement longitudinally of the tumblers.

8. A husking machine including in combination, a plurality of substantially parallel longitudinally extending rotary tumblers along which the ears are conveyed, each of said tumblers being of substantially uniform peripheral cross section throughout its length and having sections of its peripheral surface disposed at different distances from its axis of rotation whereby the ears are positively tumbled about transversely a plurality of times during their movement longitudinally of the tumblers, said tumblers being inclined downwardly from their receiving end to their delivering end and having longitudinal grooves formed in the surfaces thereof.

9. A husking machine including in combination, a plurality of substantially parallel longitudinally extending rotary tumblers along which the ears are conveyed, said tumblers being inclined downwardly from their receiving end to the delivering end thereof and having grooves formed in the surface thereof, said tumblers being similar in cross section and set so that the axis of one tumbler is higher than the other, each of said tumblers being of substantially uniform peripheral cross section throughout its length, and having sections of its peripheral surface disposed at different distances from its axis of rotation whereby the ears are positively tumbled about transversely a plurality of times during their movement longitudinally of the tumblers, said tumblers being in substantially continuous gripping relation to each other throughout the entire rotation of the tumbler.

10. A husking machine including in combination, co-acting rotating husking tumblers, each of said tumblers being uniform in cross section throughout and shaped so as to produce a sidewise shifting husking line, said tumblers having grooves extending lengthwise thereof forming corrugations, one of said tumblers being slightly higher than the other, the grooves in the lower tumbler being slightly larger than the grooves in the higher tumbler, so as to aid in the spinning of the ear as it moves along the tumblers.

11. A husking machine including in combination, co-acting rotating husking tumblers, each of said tumblers being uniform in cross section throughout and shaped so as to produce a sidewise shifting husking line, said tumblers having grooves extending lengthwise thereof forming corrugations, one of said tumblers being slightly higher than the other, the grooves in the lower tumbler being slightly larger than the grooves in the higher tumbler, so as to aid in the spinning of the ear as it moves along the tumblers, and means for supporting the tumblers whereby their axes incline downwardly from the receiving end to the delivering end thereof.

12. A husking machine including in combination co-acting rotating husking tumblers longitudinally extended in parallel relation and adapted to convey the ear longitudinally thereof, each of said tumblers having a husking surface uniformly eccentric to its axis of rotation, said tumblers being so timed that the surface of maximum eccentricity on one tumbler coacts with the surface of minimum eccentricity on the other tumbler.

13. A husking machine including in combination co-acting rotating husking tumblers longitudinally extended in parallel relation and adapted to convey the ear longitudinally thereof, each of said tumblers having a husking surface uniformly eccentric to its axis of rotation, said tumblers being so timed that the surface of maximum eccentricity on one tumbler coacts with the surface of minimum eccentricity on the other tumbler, said tumblers being inclined downwardly from the receiving end to the delivery end thereof for aiding in the conveying of the ears longitudinally of the tumblers.

14. A husking machine including in combination, co-acting rotating husking tumblers, each of said tumblers having a husking surface which is eccentric to its axis of rotation, the husking surface of each tumbler being uniform in cross section throughout, each of said tumblers having grooves extending longitudinally thereof forming corrugations, and means for supporting said tumblers, whereby their axes incline downwardly from the receiving end to the delivering end thereof, one of said tumblers being higher than the other and said lower tumbler having its grooves larger than the grooves in the other tumbler.

15. A husking machine including in combination, co-acting rotating husking tumblers, each of said tumblers having a husking surface uniformly eccentric to its axis of rotation, said tumblers being disposed relative to each other, so that the surface of maximum eccentricity of one tumbler coacts with the surface of minimum eccentricity on the other tumbler, each of said tumblers having grooves extending longitudinally thereof forming corrugations, and means for supporting said tumblers with their axes inclined downwardly from the receiving end to the delivering end thereof.

16. A husking machine including in combination co-acting rotating husking tumblers longitudinally extended in parallel relation and adapted to convey the ear longitudinally thereof, each of said tumblers being elliptical in cross section and so timed that the husking surface at the major axis of one tumbler coacts with the husking surface at the minor axis of the other tumbler, whereby the ear of corn is raised and lowered and shifted sidewise during husking.

17. A husking machine including in combination co-acting rotating husking tumblers longitudinally extended in parallel relation and adapted to convey the ear longitudinally thereof, each of said tumblers being elliptical in cross section and so timed that the husking surface at the major axis of one tumbler coacts with the husking surface at the minor axis of the other tumbler, whereby the ear of corn is raised and lowered and shifted sidewise during husking, and means for supporting the tumblers, whereby their axes incline downwardly from the receiving end to the delivery end thereof.

18. A husking machine including in combination co-acting rotating husking tumblers longitudinally extended in parallel relation and adapted to convey the ear longitudinally thereof, each of said tumblers being elliptical in cross section and so timed that the husking surface at the major axis of one tumbler coacts with the husking surface at the minor axis of the other tumbler, whereby the ear of corn is raised and lowered and shifted sidewise during husking, each tumbler being provided with grooves extending longitudinally thereof, and means for suporting the tumblers, whereby their axes incline downwardly from the receiving end to the delivery end thereof, the axis of one of said tumblers being higher than the other and the grooves in the lower tumbler being larger than the grooves in the higher tumbler.

19. A husking machine including in combination, co-acting rotating husking tumblers, one of said tumblers being formed of independent sections, means for supporting said sections whereby one portion thereof is adapted to yield independently of other portions, each portion being eccentric to its axis of rotation, and means for interlocking the sections for maintaining their relative position to each other.

20. A husking machine including in combination, co-acting rotating husking tumblers, one of said tumblers being formed of independent sections, means for supporting said sections whereby one portion thereof is adapted to yield independently of other portions, each section being eccentric to its axis of rotation, and means for interlocking the sections for maintaining their relative position to each other, each of the tumblers having grooves extending longitudinally thereof and forming a corrugated husking surface.

21. A husking machine including in combination, co-acting rotating husking tumblers, one of said tumblers being formed of independent sections, means for supporting said sections whereby one portion thereof is adapted to yield independently of other portions, each section being eccentric to its axis of rotation, means for interlocking the sections for maintaining their relative position to each other, each of the tumblers having grooves extending longitudinally thereof and forming a corrugated husking surface, and means for supporting said tumblers with their axes inclined downwardly from the receiving end to the delivering end thereof.

22. A husking machine including in combination, co-acting rotating husking tumblers, one of said tumblers being formed of independent sections, means for supporting said sections whereby one portion thereof is adapted to yield independently of other portions, each section being eccentric to its axis of rotation, means for interlocking the sections for maintaining their relative position to each other, each of the tumblers having grooves extending longitudinally thereof and forming a corrugated husking surface, and means for supporting said tumblers with their axes inclined downwardly from the receiving end to the delivering end thereof and with the axis of one tumbler higher than the other, the grooves in the lower tumbler being larger than the grooves in the other tumbler.

23. In a husking machine including in combination, co-acting rotating husking tumblers, each tumbler being elliptical in cross section throughout, said tumblers being formed of sections so as to yield independently of each other, and means for interlocking the sections for maintaining their relative position to each other, each of said tumblers having grooves extending longitudinally thereof and forming corrugated husking surfaces.

24. In a husking machine including in combination, co-acting rotating husking tumblers, each tumbler being elliptical in cross section throughout, said tumblers being formed of sections so as to yield independently of each other, means for interlocking the sections for maintaining their relative position to each other, each of said tumblers having grooves extending longitudinally thereof and forming corrugated husking surfaces, said tumblers being so disposed relative to each other that the husking surfaces at the major axis of one tumbler co-acts with the husking surfaces at the minor axis of the other tumbler.

25. In a husking machine including in combination, co-acting rotating husking tumblers, each tumbler being elliptical in cross section throughout, said tumblers being formed of sections so as to yield independently of each other, means for interlocking the sections for maintaining their relative positions to each other, each of said tumblers having grooves extending longitudinally thereof and forming corrugated husking surfaces, said tumblers being so disposed relative to each other that the husking surfaces at the major axis of one tumbler co-acts with the husking surfaces at the minor axis of the other tumbler, and means for supporting said tumblers with their axes inclined downwardly from the receiving end to the delivering end thereof.

In testimony whereof, I affix my signature, in the presence of two witnesses.

WILLIAM HAMMOND LEISTER.

Witnesses:
    RALPH COVER,
    WM. WINGLY.